United States Patent
VanBlon et al.

(10) Patent No.: US 11,556,233 B2
(45) Date of Patent: Jan. 17, 2023

(54) CONTENT SIZE ADJUSTMENT

(71) Applicant: Lenovo (Singapore) Pte. Ltd., Singapore (SG)

(72) Inventors: Russell Speight VanBlon, Raleigh, NC (US); Ryan Charles Knudson, Durham, NC (US); Roderick Echols, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/895,569

(22) Filed: Feb. 13, 2018

(65) Prior Publication Data

US 2019/0250801 A1    Aug. 15, 2019

(51) Int. Cl.
*G06F 3/04845*    (2022.01)
*G06F 3/01*    (2006.01)
*G06F 3/0488*    (2022.01)

(52) U.S. Cl.
CPC .......... *G06F 3/04845* (2013.01); *G06F 3/017* (2013.01); *G06F 3/0488* (2013.01); *G06F 2203/04806* (2013.01)

(58) Field of Classification Search
CPC .... G06F 3/04845; G06F 3/017; G06F 3/0488; G06F 2203/04806; G06F 3/0346; G06F 2203/0381; G06F 3/013
See application file for complete search history.

(56) References Cited

U.S. PATENT DOCUMENTS

| | | | | |
|---|---|---|---|---|
| 2006/0271870 A1* | 11/2006 | Anwar | ............... | G06F 3/0481 715/764 |
| 2009/0319888 A1* | 12/2009 | Oygard | ............... | G06F 40/189 715/252 |
| 2010/0243516 A1* | 9/2010 | Martin | ............... | G11B 31/00 206/701 |
| 2010/0296802 A1* | 11/2010 | Davies | ............... | G03B 17/00 396/77 |
| 2011/0226115 A1* | 9/2011 | Dangerfield | ...... | G09F 21/026 84/602 |
| 2011/0320938 A1* | 12/2011 | Schorsch | ......... | G06F 40/109 715/269 |
| 2012/0032984 A1* | 2/2012 | Chen | ................. | G06F 1/1626 345/660 |
| 2012/0110438 A1* | 5/2012 | Peraza | ............... | G06F 40/109 715/243 |
| 2013/0033485 A1* | 2/2013 | Kollin | ................ | G06F 1/1637 345/419 |

(Continued)

FOREIGN PATENT DOCUMENTS

CN    104636097 B  *  9/2017  ............. G06F 3/013

*Primary Examiner* — Daniel W Parcher
(74) *Attorney, Agent, or Firm* — Ference & Associates LLC (57) ABSTRACT

One embodiment provides a method, including: receiving, at an information handling device, an indication to display content at a first size on a display screen, wherein only a portion of the content is viewable at the first size on the display screen; detecting, at the information handling device, a resize gesture; and adjusting, responsive to the resize gesture, a size of the content from the first size to a second size, wherein more than the portion of the content is viewable at the second size on the display screen. Other aspects are described and claimed.

13 Claims, 3 Drawing Sheets

(56) References Cited

U.S. PATENT DOCUMENTS

| | | | |
|---|---|---|---|
| 2013/0293588 A1* | 11/2013 | Yu | G06F 1/1626 |
| | | | 345/660 |
| 2014/0115432 A1* | 4/2014 | Turner | G06F 40/114 |
| | | | 715/205 |
| 2014/0157116 A1* | 6/2014 | Guo | G06F 40/106 |
| | | | 715/252 |
| 2014/0316543 A1* | 10/2014 | Sharma | G06F 3/1423 |
| | | | 700/94 |
| 2015/0149956 A1* | 5/2015 | Kempinski | G06F 3/013 |
| | | | 715/784 |
| 2015/0254905 A1* | 9/2015 | Ramsby | G06T 19/006 |
| | | | 345/419 |
| 2016/0156838 A1* | 6/2016 | Cheng | H04N 5/23219 |
| | | | 348/222.1 |
| 2017/0206428 A1* | 7/2017 | Weiss | G06F 3/0485 |
| 2018/0007340 A1* | 1/2018 | Stachowski | G06F 3/0483 |
| 2018/0081432 A1* | 3/2018 | Chen | G06F 3/013 |

* cited by examiner

CONTENT SIZE ADJUSTMENT

BACKGROUND

Advances in technology have enabled many of the features and capabilities of conventional information handling devices (e.g., laptop and personal computers, smart phones, tablets, etc.) to be embodied on smaller, accessory devices such as smart watches, fitness trackers, and the like. For example, many of these accessory devices are capable of engaging in audio and visual communications, providing event notifications, performing GPS navigation, accessing social media, monitoring biometric and fitness data, and the like. As a result of their smaller size, any visual information provided is displayed on a correspondingly small display screen.

BRIEF SUMMARY

In summary, one aspect provides a method, comprising: receiving, at an information handling device, an indication to display content at a first size on a display screen, wherein only a portion of the content is viewable at the first size on the display screen; detecting, at the information handling device, a resize gesture; and adjusting, responsive to the resize gesture, a size of the content from the first size to a second size, wherein more than the portion of the content is viewable at the second size on the display screen.

Another aspect provides an information handling device, comprising: a display screen; a processor; a memory device that stores instructions executable by the processor to: receive an indication to display content at a first size on the display screen, wherein only a portion of the content is viewable at the first size on the display screen; detect a resize gesture; and adjust, responsive to the resize gesture, a size of the content from the first size to a second size, wherein more than the portion of the content is viewable at the second size on the display screen.

A further aspect provides a product, comprising: a storage device that stores code, the code being executable by a processor and comprising: code that receives an indication to display content at a first size on a display screen, wherein only a portion of the content is viewable at the first size on the display screen; code that detects a resize gesture; and code that adjusts, responsive to the resize gesture, a size of the content from the first size to a second size, wherein more than the portion of the content is viewable at the second size on the display screen.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices having smaller display screens (e.g., smart watches, fitness trackers, various smart phones, etc.) have limited screen real estate, which often causes visual information displayed on the screen to be cut off. Incoming communications (e.g., text messages, emails, etc.) and other text or image based sources (e.g., e-books, websites, etc.) are frequently affected by the dimensional limitations of these smaller screens. Generally, when an instruction is received by the device to display a text-based document, if the document comprises more text than is able to be reasonably displayed on the screen, only a portion of the text-based document will be displayed with the remainder of the text being cut off and replaced with an ellipses. For example, responsive to receiving the text message, "Hey John, can you grab some milk, bread, and cheese on your way home?" a smart watch may truncate this message to "Hey John, can you grab some milk, bread, and . . . " Similarly, in the case of a displayed image, only a portion of the image may be able to fit on the display screen at once.

Conventionally, users may visualize the remainder of the text-based message and/or image by performing additional interactions with the device. For instance, using the aforementioned text message example, in order for the recipient to see the entire message, they can provide additional input to the device (e.g., perform various "zoom" functions, swipe or slide the screen, etc.). However, the provision of this extra input is burdensome to a user and is especially difficult if a user's interaction hand is preoccupied (e.g., holding another object, etc.). Additionally, performing touch-based interactions with the device consumes device power, which may significantly affect a device's power reserves if a user receives an abundance of long text-based communications.

Accordingly, an embodiment provides a method for adjusting the size of displayed content so that the entirety of the content is visible to a user. In an embodiment, an indication to display content at an original size may be received. For example, a user may receive an incoming communication (e.g., a text message, email, etc.) that may be displayed on the display screen. The original size of the content may be associated with a size that prevents the display screen from displaying the entirety of the content. For example, a user may receive a long text message that is unable to be fully displayed on the screen at a first (i.e., original) size. An embodiment may thereafter receive a resize gesture and adjust, responsive to the resize gesture, a size of the content from the first size to a second size. In an embodiment, the second size of the content may allow the user to visualize more of the content than was visible at the first size (e.g., a user may be able to visualize an entirety of the content, etc.). Such a method may therefore enable a user to more easily manipulate the size and amount of content displayed on a display screen.

The illustrated example embodiments will be best understood by reference to the figures. The following description is intended only by way of example, and simply illustrates certain example embodiments.

Figure 1:
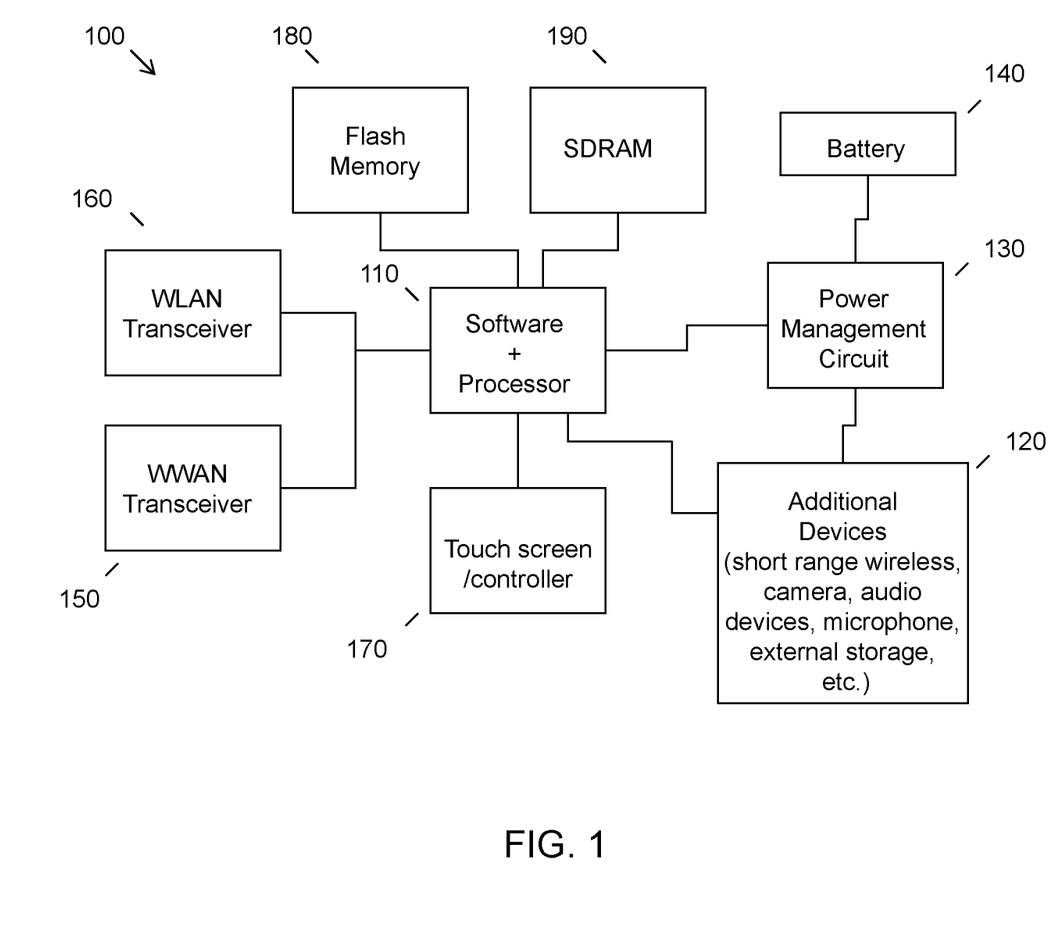
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
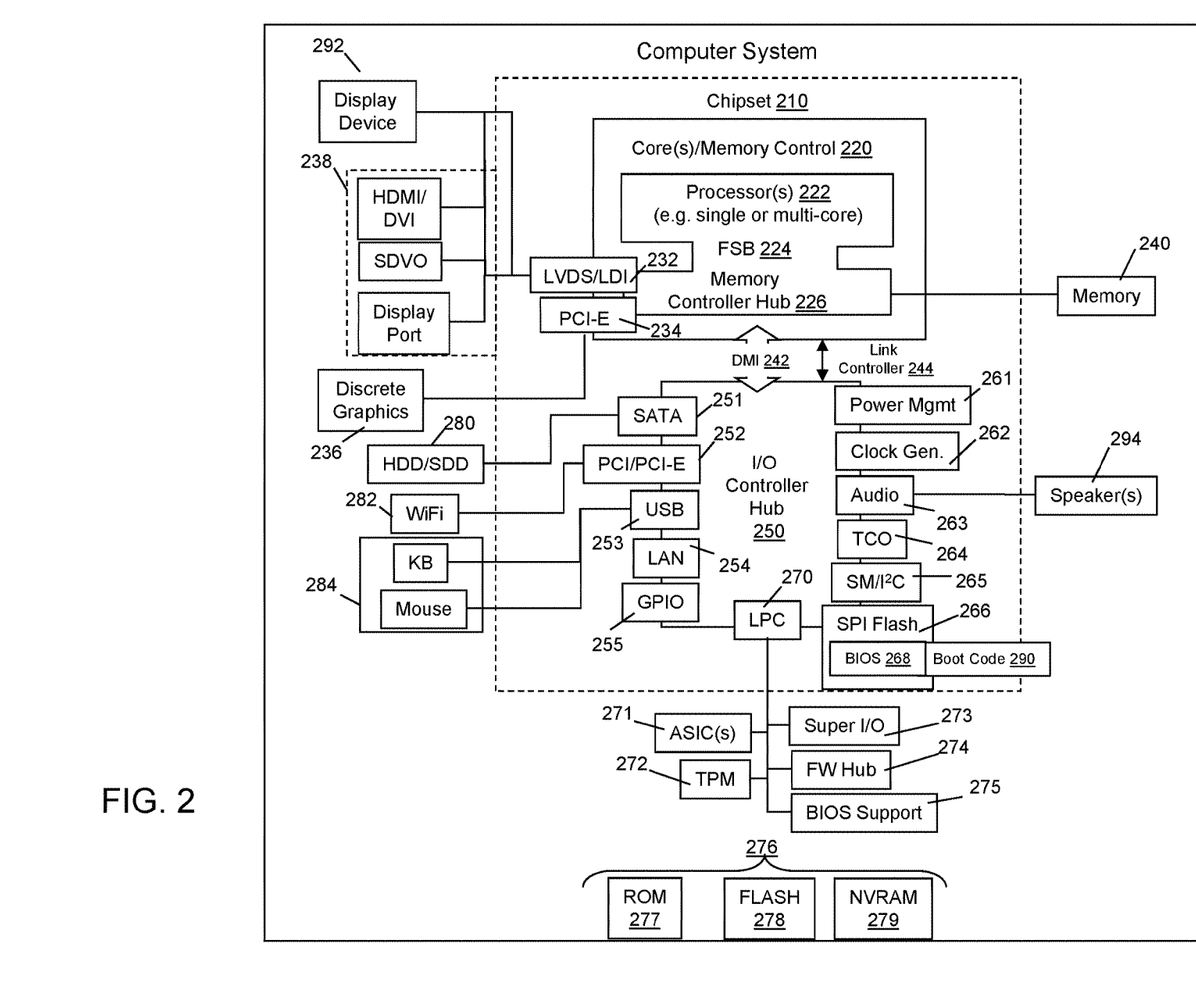
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart watches, fitness tracker, other wearable devices, and/or electronic devices that may be capable resizing displayed content responsive to detecting a resize gesture. For example, the circuitry outlined in FIG. 1 may be implemented in a tablet or smart phone embodiment, whereas the circuitry outlined in FIG. 2 may be implemented in a personal computer embodiment.

Figure 3:
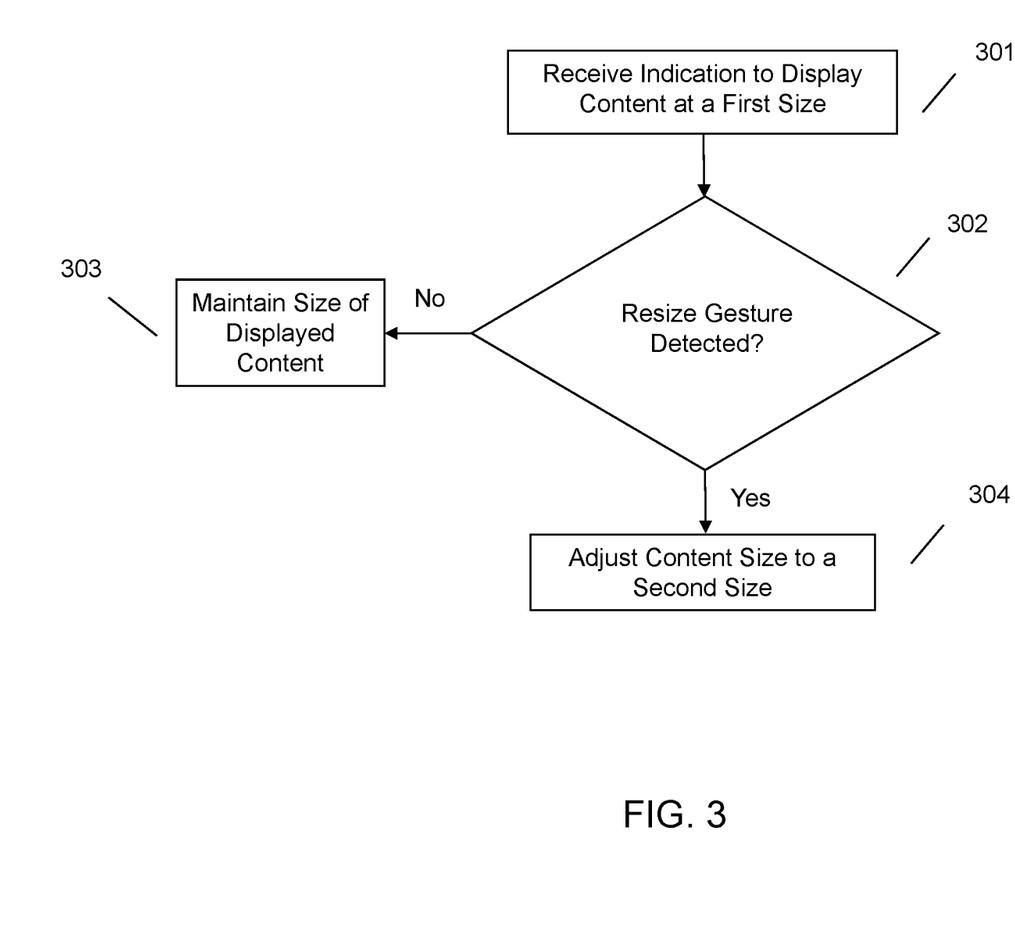
FIG. 3 illustrates an example method of displaying an entirety of content on a display screen of an information handling device.

Referring now to FIG. 3, an embodiment may adjust a size of displayed content so that the entirety of content may be displayed on a display screen. At 301, an embodiment may receive an indication to display content at a first size on a display screen integrally coupled to an information handling device (e.g., smart phone, smart watch, fitness tracker, etc.). In an embodiment, the indication to display content may result from an incoming communication (e.g., a received text message, a received email message, etc.), a user command to display content (e.g., an audible command, a touch command, etc.), and the like. In an embodiment, the content may be textual content, image content (e.g., static images, dynamic images, etc.), or a combination thereof.

In an embodiment, whenever an indication to display content is received, the content may originally be displayed at the first size. In an embodiment, the entirety of the content may not be able to completely fit on the display screen when displayed at the first size. In such a case, only a portion of the content may be displayed, while the remainder of the content is omitted and/or or replaced with a filler, or symbol (e.g., an ellipses, etc.). For example, the text message, "Hey John, can you grab some milk, bread, and cheese on your way home?" may be originally displayed at a first size that may require a display screen of a smart watch to only display a portion of the message, e.g., "Hey John, can you grab some milk, bread, and . . . " In an embodiment, the first size may be a predetermined size set by a manufacturer (e.g., a conventional size of content used across a variety of information handling device, etc.) or, alternatively, may be a size set and adjusted by the user.

At 302, an embodiment may detect and/or receive a resize gesture. The resize gesture may serve to adjust the size of the content so that more of the content may be displayed on the screen. In an embodiment, the resize gesture may be associated with a predetermined movement of the device. For example, the device may be a wearable device, such as a smart watch, and the predetermined movement may be a movement of the smart watch toward a user's face. In another embodiment, the resize gesture may be associated with a predetermined movement, or gesture, of the user. For example, a user may move all, or a portion of (e.g., their hand, etc.), their body toward the device. In an embodiment, in both of the aforementioned situations, the resize gesture may be a non-contact gesture in which no physical contact is made by the user with the display screen of the device (e.g., with the user's other hand, etc.).

In an embodiment, the resize gesture may be identified based upon data obtained from one or more sensors of the device (e.g., accelerometers, gyroscopes, etc.). For example, an accelerometer may be able to detect the upward motion of a device (e.g., a smart watch, etc.) toward the user's face. Additionally or alternatively, the resize gesture may be identified by data obtained by another device in communication with the device. For example, a user may be wearing another wearable device, such as a smart headset (e.g., Google Glass®, etc.), that may be able to communicate with the device and detect when the device is moving toward the headset.

Responsive to detecting, at 302, a resize gesture, an embodiment may, at 304, adjust a size of the content from the original size to another size. In an embodiment, the other size of the content may be smaller than the original size. In such an embodiment, due to the smaller size of the content, the display screen may be capable of displaying more, or all, of the content at the other size. Responsive to not detecting, at 302, a resize gesture, an embodiment may maintain, at 303, the size of the content at the original size.

In an embodiment, the size of the content may be continuously adjusted as a resize gesture is being received. For example, using the aforementioned example of the resize gesture being a predetermined movement of the device, as a user moves their wearable device toward their face, the content displayed on the screen may become smaller the closer the device gets to the user's face. In an embodiment, the size of the content may be continuously adjusted until the content size reaches a predetermined threshold size. For example, if the original size of the content is size 10, the content size may be decreased until the content size reaches a predetermined threshold size of 5, at which point the content size is no longer decreased, regardless of whether the resize gesture is being detected and/or received. In another embodiment, the predetermined threshold size may be the largest size at which the entirety of the content is capable of being displayed on the display screen. For example, if at an original size 10 only a portion of the content is capable of being displayed, the content size may be adjusted to a content size 7, which may be the largest content size that the entirety of the content is capable of being displayed on the display screen.

In an embodiment, initiation of content size adjustment may only begin once a predetermined condition is met. For example, the content size adjustment may begin only after it is detected that a user's gaze is focused on the display screen of the device. In an embodiment, a wearable device (e.g., smart watch, fitness tracker, etc.) may be equipped with one or more sensors (e.g., front-facing cameras, etc.) capable of performing gaze detection functions (e.g., capturing images of the user's face at predetermined intervals to identify gaze direction, etc.). Using the one or more sensors, an embodiment may detect a point when a user's gaze is focused on the display screen and then, when a resize gesture is detected, an embodiment may begin content size adjustment from that point. In an embodiment, if a resize gesture is detected prior to determining that a user's gaze is focused on the display, an embodiment may not adjust the size of the content.

In another embodiment, the initiation of content size adjustment may begin when the device is a predetermined distance away from a user's face. In such a situation, an embodiment may, for example, capture one or more images of a user's face and, based on the captured image(s), detect a distance away from the user's face the device is (e.g., by identifying a size metric of a user's face, etc.). An embodiment may begin content size adjustment responsive to detecting a resize gesture and identifying that the user's face in the captured image(s) is a predetermined size, the predetermined size corresponding to a predetermined distance. Additionally or alternatively, a user may wear another wearable device (e.g., a smart headset, etc.) capable of communicating with and/or detecting a distance between the user's device and the smart headset. An embodiment may begin content size adjustment responsive to detecting a resize gesture and identifying that a distance between the device and the other wearable device matches, or is within, a predetermined distance. In an embodiment, if a resize gesture is detected when the device is at a greater distance from the user's face than the predetermined distance, an embodiment may not adjust the size of the content.

In an embodiment, responsive to detecting the resize gesture, an embodiment may also expand a content display area of the display screen. Conventionally, display screens display a variety of different types of visual data to the user (e.g., various icons, a time indicator, a battery power indicator, date window, etc.) in addition to requested or received content. In an embodiment, the content display area may be expanded by minimizing and/or removing one or more pieces of existing visual data and replacing the vacant space that was previously occupied by the visual data with content. In an embodiment, a predetermined ruleset may govern the order in which the visual data is minimized and/or removed. As an example of content display area expansion, responsive to detecting a resize gesture, an embodiment may remove a date window and allow content to occupy the space that was previously occupied by the date window. Such an embodiment may allow the entirety of the content to be displayed quicker and at a larger size. In an embodiment, the expansion of the content display area may occur substantially simultaneously with the adjustment of the content size.

Responsive to receiving an indication to display different content, an embodiment may display the different content at the original size. For example, responsive to receiving an indication to display different content, the existing content, which may currently be displayed at content size 7, may be removed from the display and replaced with the different content displayed at original content size 10. In another embodiment, the system may utilize machine learning techniques to dynamically adjust the size of the new content based upon an identified size and/or length characteristic of the new content. For example, an embodiment may identify that previously displayed textual content was 20 words long and in order for the entirety of that previous content to be displayed on the display the previous content size had to be size 6. Responsive to receiving different content that is also 20 words long, an embodiment may approximate that the length of the different content is similar to the length of the previous content and thereafter dynamically, without user input, adjust the size of the different content to size 6. Although the previous example utilized a word count metric to approximate the content size that may allow the entirety of the new content to be displayed on the display screen, other metrics may also be used such as pixel space occupation, other content length determination techniques, etc.

The various embodiments described herein thus represent a technical improvement to conventional content size adjustment techniques. Using the techniques described herein, an embodiment may receive an indication to display content at a first, original size, where the content at the first size is unable to be displayed on a display screen of a device in its entirety. Responsive to receiving a resize gesture, an embodiment may adjust the size of the content to another size at which the content may be capable of being fully displayed on the display screen. Additionally and/or alternatively, an embodiment may detect, in addition to detecting the user resize gesture, whether a predetermined condition is satisfied (e.g., whether a user's gaze is directed to a display of the device, whether the device is within a predetermined distance from the user's face, etc.) and, responsive to identifying the point at which the predetermined condition is satisfied, initiating content size adjustment from that point. Such techniques enable a user to easily resize displayed content so that an entirety of the content may be able to be displayed on the screen.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, an indication to display text content at a first size on a display screen, wherein only a portion of the text content is viewable at the first size on the display screen;
determining that a projected pixel space needed to display an entirety of the text content at the first size is larger than the projected pixel space needed to display an entirety of a previous text segment at the first size, wherein the text content is different from the previous text segment;
detecting, subsequent to the determining, a resize gesture, wherein the resize gesture is associated with a predetermined movement of the information handling device;
decreasing, responsive to the detecting and based at least in part on a degree of the resize gesture, a size of the new text content from the first size to at least one smaller size, wherein the at least one smaller size is not larger than a second size that the previous text segment was adjusted to so that an entirety of the previous text segment was displayable on the display screen, wherein the decreasing the size of the new text content comprises resizing the size of the new text until reaching a threshold size associated with the display screen and wherein the threshold size comprises utilizing a maximum size text capable of displaying the entirety of text on the display screen; and
displaying, in response to the decreasing, the text content at the at least one smaller size, wherein the displaying comprises removing at least one existing visual data object on the display screen and replacing vacant space with the text content and utilizing one or more machine learning techniques to dynamically adjust the size of the text content;
the removing the at least one existing visual data object from the display screen comprising identifying each of the at least one existing visual data object to be removed based upon a predetermined governing order for removing the visual data objects on the display, wherein the displaying comprises expanding the projected pixel space needed to display the entirety of the text content at the at least one smaller size, wherein the displaying comprises the text content at the at least one smaller size occupying a space on the display that was previously occupied by at least one of the removed visual data objects;
wherein the information handling device is not a head-mounted-device.

2. The method of claim 1, wherein the predetermined movement is associated with a movement of the information handling device toward a user's face.

3. The method of claim 1, wherein the resize gesture is associated with a non-contact gesture with respect to the display screen.

4. The method of claim 1, further comprising:
determining, using at least one sensor, a direction of a user's gaze; and
wherein the adjusting comprises adjusting the size of the content when the direction of the user's gaze is determined to be directed toward the information handling device.

5. The method of claim 1, further comprising expanding, responsive to detecting the resize gesture, a content display area of the display screen.

6. The method of claim 1, further comprising responsive to receiving an indication to display different content, displaying the different content at the first size.

7. An information handling device, comprising:
a display screen;
a processor;
a memory device that stores instructions executable by the processor to:
receive an indication to display text content at a first size on the display screen, wherein only a portion of the text content is viewable at the first size on the display screen;
determine that a pixel space needed to display an entirety of the text content at the first size is larger than the projected pixel space needed to display an entirety of a previous text segment at the first size, wherein the text content is different from the previous text segment;
detect, subsequent to the determining, a resize gesture, wherein the resize gesture is associated with a predetermined movement of the information handling device;
decrease, responsive to the detecting and based at least in part on a degree of the resize gesture, a size of the new text content from the first size to at least one smaller size, wherein the at least one smaller size is not larger than a second size that the previous text segment was adjusted to so that an entirety of the previous text segment was displayable on the display screen, wherein to decrease the size of the new text content comprises resizing the size of the new text until reaching a threshold size associated with the display screen and wherein the threshold size comprises utilizing a maximum size text capable of displaying the entirety of text on the display screen; and
display, in response to the decreasing, the text content at the at least one smaller size, wherein to display comprises removing at least one existing visual data object on the display screen and replacing vacant space with the text content and utilizing one or more machine learning techniques to dynamically adjust the size of the text content;
the removing the at least one existing visual data object from the display screen comprising identifying each of the at least one existing visual data object to be removed based upon a predetermined governing order for removing the visual data objects on the display, wherein the instructions to display comprise instructions to expand the projected pixel space needed to display the entirety of the text content at the at least one smaller size, wherein the instructions to display comprises the text content at the at least one smaller size occupying a space on the display that was previously occupied by at least one of the removed visual data objects;
wherein the information handling device is not a head-mounted device.

8. The information handling device of claim 7, wherein the resize gesture is associated with a predetermined movement of the information handling device.

9. The information handling device of claim 8, wherein the predetermined movement is associated with a movement of the information handling device toward a user's face.

10. The information handling device of claim 7, wherein the resize gesture is associated with a non-contact gesture with respect to the display screen.

11. The information handling device of claim 7, wherein the instructions are further executable by the processor to:
   determine, using at least one sensor, a direction of a user's gaze; and
   wherein the instructions executable by the processor to adjust comprise instructions executable by the processor to adjust the size of the content when the direction of the user's gaze is determined to be directed toward the information handling device.

12. The information handling device of claim 7, wherein the instructions are further executable by the processor to display, responsive to receiving an indication to display different content, the different content at the first size.

13. A computer program product, comprising:
   a storage device having code stored therewith, the code being executable by a processor and comprising:
   code that receives an indication to display text content at a first size on a display screen of an information handling device, wherein only a portion of the text content is viewable at the first size on the display screen;
   code that determines that a projected pixel space needed to display an entirety of the text content at the first size is larger than the projected pixel space needed to display an entirety of a previous text segment at the first size, wherein the text content is different from the previous text segment;
   code that detects, subsequent to the code that determines, a resize gesture, wherein the resize gesture is associated with a predetermined movement of the information handling device;
   code that decreases, responsive to the code that detects and based at least in part on a degree of the resize gesture, a size of the new text content from the first size to at least one smaller size, wherein the at least one smaller size is not larger than a second size that the previous text segment was adjusted to so that an entirety of the previous text segment was displayable on the display screen, wherein the code that decreases the size of the new text content comprises resizing the size of the new text until reaching a threshold size associated with the display screen and wherein the threshold size comprises utilizing a maximum size text capable of displaying the entirety of text on the display screen; and
   code that displays, in response to the code that decreases, the text content at the at least one smaller size, wherein the code that displays comprises removing at least one existing visual data object on the display screen and replacing vacant space with the text content and utilizing one or more machine learning techniques to dynamically adjust the size of the text content;
   the removing the at least existing visual data object from the display screen comprising identifying each of the at least one existing visual data object to be removed based upon a predetermined governing order for removing the visual data objects on the display, wherein the code that displays comprises code that expands the projected pixel space needed to display the entirety of the text content at the at least one smaller size, wherein the code that displays comprises the text content at the at least one smaller size occupying a space on the display that was previously occupied by at least one of the removed visual data objects;
   wherein the information handling device is not a head-mounted device.

\* \* \* \* \*